United States Patent
Richey et al.

(10) Patent No.: US 8,029,849 B2
(45) Date of Patent: Oct. 4, 2011

(54) MULTI-PIECE FOOD PRODUCT AND METHOD FOR MAKING THE SAME

(75) Inventors: Stephen B. Richey, Marshall, MI (US); Guoshen Yang, Battle Creek, MI (US); Myung Hee Lohman, Battle Creek, MI (US); Mary E. Steele, Battle Creek, MI (US); Brian M. Reifsteck, Battle Creek, MI (US); Pradip K. Roy, Grand Rapids, MI (US); Sylvia L. Schonauer, Battle Creek, MI (US)

(73) Assignee: Kellogg Company, Battle Creek, MI (US)

( * ) Notice: Subject to any disclaimer, the term of this patent is extended or adjusted under 35 U.S.C. 154(b) by 2241 days.

(21) Appl. No.: 10/944,209

(22) Filed: Sep. 17, 2004

(65) Prior Publication Data

US 2005/0064087 A1    Mar. 24, 2005

Related U.S. Application Data (60) Provisional application No. 60/504,487, filed on Sep. 19, 2003.

(51) Int. Cl.
*A23G 3/54* (2006.01)

(52) U.S. Cl. .......................................... 426/660; 426/500

(58) Field of Classification Search .................. 426/660, 426/249, 500
See application file for complete search history.

(56) References Cited

U.S. PATENT DOCUMENTS

| | | | |
|---|---|---|---|
| 166,810 A * | 8/1875 | Kretchmer | 112/70 |
| 10,882 A | 10/1878 | Mills | |
| 11,173 A | 4/1879 | Mills | |
| 279,131 A | 6/1883 | Chase | |
| 498,142 A | 1/1893 | Thoens | |
| 559,323 A | 1/1895 | Drake | |
| 649,569 A | 5/1900 | Cox | |

(Continued)

FOREIGN PATENT DOCUMENTS

AT    390 354 B    4/1990

(Continued)

OTHER PUBLICATIONS

R Lees and EB Jackson, Sugar Confectionary and Chocolate Manufacture, Leonard Hill 1973. pp. 97-100.*

(Continued)

*Primary Examiner* — Kelly Bekker
(74) *Attorney, Agent, or Firm* — Dickinson Wright PLLC (57) ABSTRACT

A multi-piece food product (10) comprising a plurality of strands (12A-12K) that are extruded and aggregated to form an aesthetically pleasing food product is provided. A formulation used to make each of the strands (12A-12K) includes a mixture comprising at least 20% sweetener, at least 15% starchy material, and at least 1% fruit by weight based a total dry weight of the mixture to yield a starch-based confectionary food product. One process for forming the multi-piece food product (10) includes extruding a food stream from a slurry, dividing the food stream into three separate food streams (24A, 24B), injecting color, flavor, and ascorbic acid into the food streams (24A, 24B), conveying the food streams (24A, 24B) into a former (26) and extruding the strands (12A-12K) therefrom, forming the strands (12A, 12B) into an aggregate food mass (31), cooling the food mass (31), and cutting the food mass (31) into individual portions.

22 Claims, 8 Drawing Sheets

U.S. PATENT DOCUMENTS

| | | | |
|---|---|---|---|
| 1,149,170 A | 4/1915 | Allis | |
| 1,769,215 A | 7/1925 | Firmin | |
| 1,714,234 A | 11/1927 | Ost | |
| 1,713,585 A | 2/1928 | Wolf | |
| 1,709,280 A | 3/1928 | Ost | |
| 1,927,041 A | 9/1929 | Mayhew | |
| 1,788,689 A | 5/1930 | Penza | |
| 2,067,200 A | 5/1931 | Mayhew | |
| 2,000,384 A | 8/1934 | Frantz | |
| 2,149,920 A | 8/1937 | Kretchmer | |
| 2,199,825 A | 9/1937 | Kretchmer | |
| 116,617 A | 6/1939 | Tanzi | |
| 2,234,526 A | 5/1940 | Guldbech | |
| 2,463,112 A | 3/1949 | Kipnis | |
| 2,726,960 A | 12/1955 | Bolanowski | |
| 2,856,868 A | 10/1958 | Kennedy | |
| 3,130,060 A | 4/1964 | Evans | |
| 3,213,808 A | 10/1965 | Schafer | |
| 3,265,508 A | 8/1966 | Wurzburg et al. | |
| 3,265,509 A | 8/1966 | Wurzburg et al. | |
| 3,265,510 A | 8/1966 | Wurzburg | |
| 3,374,096 A | 3/1968 | Knoch | |
| 3,767,338 A | 10/1973 | Soderlund et al. | |
| 3,876,743 A | 4/1975 | Soderlund et al. | |
| 4,117,176 A | 9/1978 | Taylor et al. | |
| 4,205,093 A * | 5/1980 | Blake | 426/333 |
| 4,288,463 A | 9/1981 | Groff et al. | |
| 4,334,845 A | 6/1982 | Tamminen | |
| 4,504,511 A | 3/1985 | Binley | |
| 4,567,055 A | 1/1986 | Moore | |
| 4,704,293 A | 11/1987 | Moore et al. | |
| 4,879,126 A | 11/1989 | Willard et al. | |
| 4,900,572 A | 2/1990 | Repholz et al. | |
| 4,925,380 A | 5/1990 | Meisner | |
| 4,948,615 A * | 8/1990 | Zallie et al. | 426/578 |
| 4,988,531 A | 1/1991 | Moore et al. | |
| 5,019,404 A | 5/1991 | Meisner | |
| 5,460,079 A | 10/1995 | Bartow et al. | |
| 5,492,706 A | 2/1996 | Cockings et al. | |
| H1527 H | 4/1996 | Moore | |
| 5,518,749 A | 5/1996 | Weinstein | |
| 5,549,921 A | 8/1996 | Robinson et al. | |
| 5,554,410 A | 9/1996 | Bell et al. | |
| 5,609,903 A | 3/1997 | Israel et al. | |
| 5,626,892 A | 5/1997 | Kehoe et al. | |
| 5,637,341 A | 6/1997 | Rivlin | |
| 5,639,485 A | 6/1997 | Weinstein et al. | |
| 5,643,618 A | 7/1997 | Huberg et al. | |
| 5,660,870 A | 8/1997 | Schantz | |
| 5,660,871 A | 8/1997 | Schantz | |
| D381,486 S | 9/1997 | Hauser et al. | |
| 5,670,185 A | 9/1997 | Heck et al. | |
| 5,686,128 A | 11/1997 | Tracy et al. | |
| 5,695,805 A | 12/1997 | Borek et al. | |
| 5,698,233 A | 12/1997 | Altvater et al. | |
| 5,700,494 A | 12/1997 | Masse et al. | |
| D391,737 S | 3/1998 | Wright | |
| 5,773,070 A | 6/1998 | Kazemzadeh | |
| 5,776,534 A | 7/1998 | Christensen et al. | |
| 5,792,497 A | 8/1998 | Abler et al. | |
| 5,827,557 A | 10/1998 | Weinstein et al. | |
| 5,834,040 A | 11/1998 | Israel et al. | |
| 5,843,503 A | 12/1998 | Clanton et al. | |
| 5,874,120 A | 2/1999 | Borek et al. | |
| D408,960 S | 5/1999 | Kauffman et al. | |
| 5,919,509 A | 7/1999 | Cremers et al. | |
| 5,955,116 A | 9/1999 | Kehoe et al. | |
| 5,962,035 A | 10/1999 | Masse et al. | |
| D426,048 S | 6/2000 | Kauffman et al. | |
| D426,368 S | 6/2000 | Wencel, Jr. et al. | |
| D428,236 S | 7/2000 | Jorg | |
| 6,098,307 A | 8/2000 | Pikus et al. | |
| 6,136,360 A | 10/2000 | Tsuchida et al. | |
| 6,143,338 A | 11/2000 | Weinstein et al. | |
| 6,143,339 A | 11/2000 | Weinstein et al. | |
| 6,143,342 A | 11/2000 | Weinstein et al. | |
| 6,199,346 B1 | 3/2001 | Ahad et al. | |
| 6,200,617 B1 | 3/2001 | Babiarz et al. | |
| 6,251,452 B1 | 6/2001 | Weinstein et al. | |
| 6,358,547 B1 | 3/2002 | Dupont | |
| 6,379,733 B2 | 4/2002 | Matthews et al. | |
| 6,428,830 B1 | 8/2002 | Matthews et al. | |
| 6,450,796 B1 | 9/2002 | Groff et al. | |
| 6,531,174 B2 | 3/2003 | Barrett et al. | |
| 6,548,090 B2 | 4/2003 | Dwivedi | |
| 6,555,152 B1 | 4/2003 | Roso | |
| 6,558,727 B2 | 5/2003 | Degady et al. | |
| 6,561,784 B1 | 5/2003 | Atwell | |
| 6,607,772 B1 | 8/2003 | Bortone | |
| 6,626,660 B1 | 9/2003 | Olson et al. | |
| 2001/0007691 A1 | 7/2001 | Matthews et al. | |
| 2002/0001665 A1 | 1/2002 | Barrett et al. | |
| 2002/0004086 A1 | 1/2002 | Zietlow et al. | |
| 2002/0025360 A1 | 2/2002 | Yang et al. | |
| 2002/0061343 A1 | 5/2002 | Horna et al. | |
| 2002/0081345 A1 | 6/2002 | Kappes et al. | |
| 2002/0086096 A1 | 7/2002 | Fux et al. | |
| 2002/0110634 A1 | 8/2002 | Zietlow et al. | |
| 2002/0136812 A1 | 9/2002 | Degady et al. | |
| 2003/0091707 A1 | 5/2003 | Jindra et al. | |
| 2003/0152681 A1 | 8/2003 | Bortone | |

FOREIGN PATENT DOCUMENTS

| | | |
|---|---|---|
| EP | 1 269 856 A2 | 1/2003 |
| GB | 1 561 190 | 2/1980 |
| GB | 2 041 716 A | 9/1980 |
| GB | 2 176 089 A | 12/1986 |
| JP | 61015660 | 6/1984 |
| WO | WO 94/01122 | 1/1994 |
| WO | WO 97/25881 | 7/1997 |

OTHER PUBLICATIONS

Darrell Lea. Liquorice Fatcs. http:www.dlea.com.au/index.php?pagename=liquorice%20facts&printer_friendly=true. pp. 1-2. Printed Feb. 13, 2008.*

Lees et al. Suagr Confectionary and Chocolate Manufacture, Leonard Hill 1973. pp. 269-285.*

E.B. Jackson, Chapter 11 "Liquorice paste, cream paste and aerated confectionary", "Sugar Confectionary Manufacture" (book), pp. 218-224, May, 1995.

R.Lees; EB Jackson, Chapter 13 "Liquorice and Cream Paste", Sugar Confectionary and Chocolate Manufacture (book), 1973, pp. 269-285; Publisher: Chemical Pub. Co., New York.

PCT International Search Report, International Application No. PCT/US2004/030799; International Filing Date Sep. 17, 2004 with Written Opinion. Apr. 12, 2005.

* cited by examiner

MULTI-PIECE FOOD PRODUCT AND METHOD FOR MAKING THE SAME

RELATED APPLICATIONS

This application claims the benefit of U.S. Provisional Application Ser. No. 60/504,487 filed on Sep. 19, 2003, the advantages and disclosure of which are herein incorporated by reference.

STATEMENT REGARDING FEDERALLY SPONSORED RESEARCH

None

FIELD OF THE INVENTION

The present invention generally relates to a multi-piece food product and a method for making the same. More specifically, the present invention relates to a starch-based confectionary formulation used to make the multi-piece food product, a method for making the multi-piece food product, and an appealing and aesthetically pleasing shape of the multi-piece food product including multiple strands.

BACKGROUND OF THE INVENTION

In recent years, food manufacturers have increased the play value and visual attractiveness of their food products in hopes of obtaining or maintaining market share, particularly with young consumers. For instance, manufacturers often create food products that assume appealing shapes such as fish or animals. Manufacturers also produce food products that comprise multiple pieces that can be separated before consumption. Typically, multi-piece food products having multiple pieces are intended to provide amusement to young consumers and aesthetic appeal to older consumers.

In addition to increasing the play value and aesthetic appeal of their products, food manufacturers have also been trying to develop fruit-based confection products, which provide additional nutritional value for young consumers. Such confectionary fruit snacks are well known. For instance, U.S. Pat. No. 4,117,176 to Taylor et al. discloses a taffy-like confection made with real fruit pieces. Similarly, U.S. Pat. No. 5,554,410 to Bell et al. discloses a hard confection product made with fruit juice and U.S. Pat. No. 6,548,090 to Dwivedi discloses an extrudable confection made with fruit concentrate.

However, the prior art listed does not disclose a starch-based confectionary food product with high levels of fruit, particularly, such a food product having multiple, intertwined strands. As a result, there is a need in the food industry for a multi-piece food product having multiple, intertwined strands comprised from a starch-based confectionary formulation with a high level of fruit.

BRIEF SUMMARY OF THE INVENTION

The present invention provides a multi-piece food product comprising an edible material made from a mixture of at least 20% sweetener, at least 15% starchy material, and at least 1% fruit based on a total dry weight of the mixture. The multi-piece food product is formed by combining at least 20% sweetener, at least 15% starchy material, and at least 1% fruit with water to form a slurry, cooking the slurry to a certain degree of starch gelatinization, extruding at least two strands of the edible material from the cooked food mass, and forming the strands into an aggregate food mass. This provides an aesthetically appealing starch-based confection with the advantage of added nutritional value.

In another aspect of the invention, at least 15% starchy material, in the form of wheat flour, is used in the mixture to form the food product. Wheat flour is advantageous in a confectionary product to reduce tackiness of the final product and to provide a significant source of protein and nutritional value to the food product. The wheat flour could be hard or soft wheat.

In yet another aspect of the invention, at least two strands of the edible material are intertwined to form the aggregate food mass. In particular, the multi-piece food product comprises a center strand of the edible material, a first outer strand of the edible material wrapped about the center strand, and a second outer strand of the edible material wrapped about the center strand. In further aspects of the invention, these strands have different colors and/or flavors. The advantage of this configuration is to provide significant play value to the food product by giving consumers the option of separating or pulling apart the strands before eating.

BRIEF DESCRIPTION OF THE SEVERAL VIEWS OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a multi-piece food product of the present invention is generally shown at 10.

Product Configuration

Figure 1:
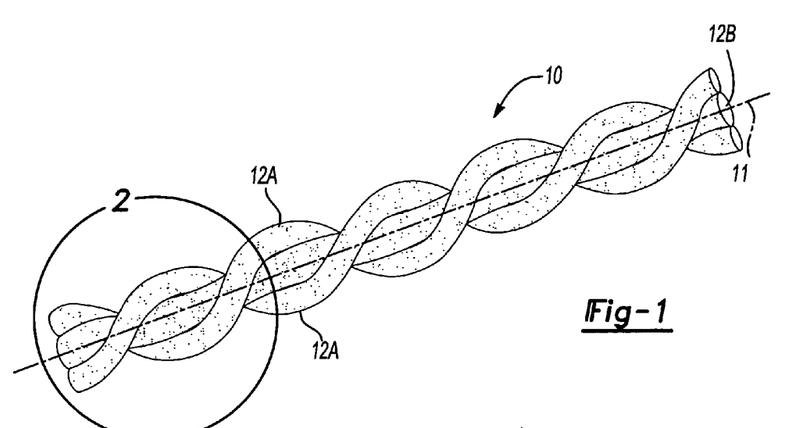
FIG. 1 is a perspective view of a multi-piece food product having three intertwined strands including two outer strands and a center strand with each of the strands having the same color or flavor.
Figure 2:
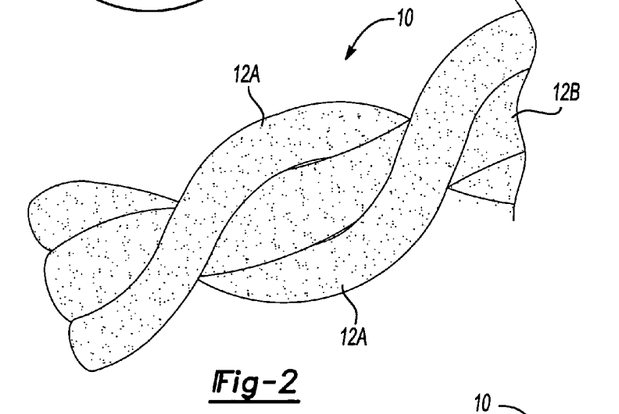
FIG. 2 is a fragmented elevational view of the multi-piece food product of FIG. 1.
Figure 3:
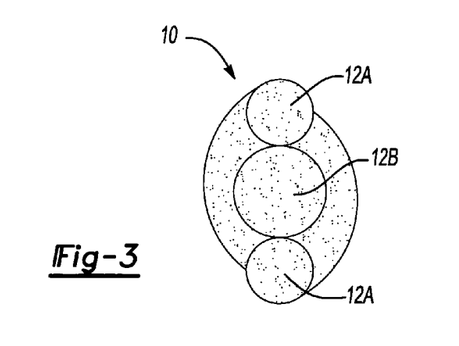
FIG. 3 is an end view of the multi-piece food product of FIG. 1.

Referring to FIGS. 1-3, the multi-piece food product 10 comprises a plurality of elongated strands 12A, 12B that have been extruded, intertwined, and then cut to form an aesthetically pleasing multi-piece food product 10. The multi-piece food product 10 of FIGS. 1-3 includes a center strand 12B of edible material having a length lying generally along an axis 11 with two outer strands 12A of edible material wrapped about the center strand 12B along its length to define first and second sets of convolutions. The convolutions are wrapped and interpositioned about the center strand 12B along its length such that the center strand 12B undulates along its length (see FIG. 2). Each of the strands 12A, 12B may comprise different colors, flavors, or combinations thereof. Utilizing separate colors for each of the strands 12A, 12B increases the play value of the multi-piece food product 10, especially with young consumers. Similarly, providing different flavors for each strand 12A, 12B increases a palatably pleasing effect of the multi-piece food product 10. In the embodiment shown in FIG. 1, the center strand 12B and each of the outer strands 12A share the same color and flavor (as indicated by the respective shading for each strand). However, as will be discussed further below, other variations are also illustrated.

Formulation

A formulation used to make the multi-piece food product 10 is a starch-based confectionary formulation. Wheat flour is a preferred source of starchy material in the multipiece food product 10. Other food grade starches such as modified corn starch, or modified corn starch in combination with wheat flour could be used. In a mixture used to form the multi-piece food product 10, the starchy material comprises about 15 to 40% by weight, more preferably 20 to 35% by weight, and most preferably 25 to 30% by weight (all values or ranges based on weight are based on a total dry weight of the mixture used to form the multi-piece food product 10, unless otherwise noted). The use of wheat flour as the starchy material provides a substantial source of protein and overall nutritional value to the multipiece food product 10. The wheat flour preferably has a protein content of 10 to 20% and more preferably has a protein content of 10 to 15%.

Sweetener provides the confectionary aspect of the formulation. The sweetener comprises 20 to 70% by weight of the mixture, more preferably 50 to 70% by weight, and most preferably 60 to 65% by weight of the mixture. The sweetener can be in the form of sucrose, dextrose, fructose, crystalline fructose, lactose, malt syrup, malt syrup solids, rice syrup solids, rice syrup, sorghum syrup, invert sugar, refiners syrup, corn syrup, corn syrup solids, maltose, high fructose corn syrup, honey, molasses, sugar alcohols, maltodextrin, or combinations thereof. It should be appreciated that a "no sugar added" product could also be formulated using sorbitol and other sugar alcohols.

The formulation also includes high levels of fruit from fruit powder, drum-dried fruit solids, freeze-dried fruit solids, or evaporated fruit puree or fruit juice concentrate with at least 40% fruit solids. It should be noted that fruits such as cleaned, de-capped, fresh strawberries contain only 6 to 9.5 lbs. of solids per hundred-weight, i.e., 6 to 9.5% solids. Hence, the formulation provided herein uses a concentrated source of fruit. Preferably, the amount of fruit ranges from 1 to 25% by weight, more preferably from 1 to 10% by weight, and most preferably from 1 to 8% by weight. The following are example formulations that can be used to produce the mixture and a slurry thereof that ultimately yields the multi-piece food product 10.

EXAMPLE 1

| INGREDIENT | % Solids (of ingredient) | % Wet wt. (as added) | % Dry wt. (as added) |
|---|---|---|---|
| Corn Syrup 42 | 81.00 | 25.85 | 26.183 |
| Wheat Flour | 87.00 | 26.77 | 29.124 |
| Crystalline Fructose | 100.00 | 11.00 | 13.755 |
| Sugar | 100.00 | 17.00 | 21.258 |
| Pear Apple Juice Conc. | 70.00 | 5.30 | 4.639 |
| Fat (Veg. Shortening) | 100.00 | 1.80 | 2.251 |
| Glycerin | 100.00 | 0.30 | 0.375 |
| Citric Acid | 100.00 | 0.90 | 1.125 |
| Sodium Citrate | 90.00 | 0.49 | 0.551 |
| Salt | 100.00 | 0.28 | 0.350 |
| Glyceryl Monostearate | 100.00 | 0.31 | 0.388 |
| Water | 0.00 | 10.00 | 0.000 |
| Total | | 100.00 | 100.00 |
| Slurry solids | 80.0 | | |

EXAMPLE 2

| INGREDIENT | % Solids (of ingredient) | % Wet wt. (as added) | % Dry wt. (as added) |
|---|---|---|---|
| Corn Syrup 63 | 81.00 | 27.06 | 28.100 |
| Wheat Flour | 87.00 | 23.81 | 26.560 |
| Corn Starch | 89.00 | 0.88 | 1.000 |
| Crystalline Fructose | 100.00 | 10.729 | 13.755 |

-continued

| INGREDIENT | % Solids (of ingredient) | % Wet wt. (as added) | % Dry wt. (as added) |
|---|---|---|---|
| Sugar | 100.00 | 16.581 | 21.258 |
| Pear Apple Juice Conc. | 70.00 | 5.303 | 4.759 |
| Fat (Veg. Shortening) | 100.00 | 1.756 | 2.251 |
| Glycerin | 100.00 | 0.390 | 0.500 |
| Citric Acid | 100.00 | 0.078 | 0.100 |
| Sodium Citrate | 90.00 | 0.000 | 0.000 |
| Salt | 100.00 | 0.501 | 0.642 |
| Glyceryl Monostearate | 100.00 | 0.780 | 1.000 |
| Potassium Sorbate | 100.00 | 0.061 | 0.078 |
| Water | 0.00 | 12.073 | 0.000 |
| Total | | 100.00 | 100.00 |
| Slurry solids | 78.0 | | |

EXAMPLE 3

| INGREDIENT | % Solids (of ingredient) | % Wet wt. (as added) | % Dry wt. (as added) |
|---|---|---|---|
| Corn Syrup 62 | 83.80 | 40.75 | 42.680 |
| Wheat Flour | 86.00 | 26.56 | 28.542 |
| Sugar | 100.00 | 14.40 | 18.000 |
| Apple/Pear Juice | 70.00 | 7.03 | 6.150 |
| Fat (Veg. Shortening) | 100.00 | 1.123 | 1.403 |
| Glyceryl Monostearate | 100.00 | 0.889 | 1.111 |
| Salt | 100.00 | 0.510 | 0.637 |
| Corn Starch | 89.00 | 0.450 | 0.500 |
| Glycerin | 100.00 | 0.400 | 0.500 |
| Citric Acid | 100.00 | 0.320 | 0.400 |
| Potassium Sorbate | 100.00 | 0.062 | 0.077 |
| Water | 0.00 | 7.501 | 0.000 |
| Total | | 100.00 | 100.00 |
| Slurry solids | 80.0 | | |

These examples illustrate that each of the ingredients can be used in varying amounts. The ranges that can be used for each of the ingredients are listed in TABLE 1 below with a preferred range, a more preferred range, and a most preferred range. For instance, referring to TABLE 1, the amount of starchy material, e.g., wheat flour, used to prepare the slurry preferably ranges from approximately 15 to 40%, more preferably from 20 to 35%, and most preferably from 25 to 30% based on a total dry weight of the mixture used to form the multi-piece food product 10.

TABLE 1

| INGREDIENT | Preferred % Dry wt. | More Preferred % Dry wt. | Most Preferred % Dry wt. |
|---|---|---|---|
| Starchy Material | 15-40 | 20-35 | 25-30 |
| (Wheat Flour) | (15-40) | (20-35) | (25-30) |
| (Corn Starch) | (0-10) | (0-5) | (0-2) |
| Sweetener | 20-70 | 50-70 | 60-65 |
| (Corn Syrup) | (20-60) | (20-50) | (20-45) |
| (Crystalline Fructose) | (0-20) | (0-18) | (5-15) |
| (Sugar) | (0-40) | (0-30) | (15-25) |
| Fruit | 1-25 | 1-10 | 1-8 |
| Edible Oil | 0-5 | 0-3 | 1-3 |
| Humectant | 0-2 | 0-1.5 | 0.3-1 |
| Wheat Gluten | 0-5 | 0-3 | 0-2 |
| Food Grade Acid | 0-3 | 0-1 | 0-0.5 |
| Buffer | 0-1 | 0-0.5 | 0-0.3 |
| Salt | 0-2 | 0-1 | 0-0.5 |
| Emulsifier | 0-3 | 0-2 | 0-0.5 |
| Preservative | 0-1 | 0-0.1 | 0-0.05 |
| Food Colors* | 0-1 | 0-0.5 | 0-0.2 |
| Total | 100.00 | 100.00 | 100.00 |

*artificial or natural food colors can be added to the slurry or injected later into food streams.

Still referring to TABLE 1, the mixture preferably has from 0 to 5% of an edible oil or shortening. Examples of edible oils or shortenings that could be used include partially hydrogenated vegetable oils such as natural or hydrogenated soybean, cottonseed, canola, peanut, safflour, sunflour, coconut, palm, palm kernel, olive, butterfat, cocoa butter, tallow, lard, corn oil, or combinations thereof.

The mixture may have a humectant such as glycerin for moisture retention. The humectant is present in the mixture in a preferred amount of from 0 to 2%. Other examples of humectants that could be used include sorbitol solution, a mixture of glycerin and sorbitol, fructose, propylene glycol, or combinations thereof.

The mixture may include wheat gluten in a preferred amount of from 0 to 5%. The wheat gluten may serve as an additional protein source and/or for controlling textural properties of the multi-piece food product 10.

The mixture may include a food grade acid such as citric acid for modifying the pH of the slurry formed from the mixture. The food grade acid is present in the mixture in a preferred amount of from 0 to 3%. Other food grade acids that could be used include malic acid, tartaric acid, ascorbic acid, phosphoric acid, lactic acid, acetic acid, adipic acid, glucono delta lactone acid, fumaric acid, succinic acid, tarenic acid, or combinations thereof.

The mixture may include a buffer such as sodium citrate for controlling the pH. The buffer is present in the mixture in a preferred amount of from 0 to 1%.

Salt may be added to the mixture in a preferred amount of from 0 to 2% to provide flavor enhancement. The salt is chosen from, but is not limited to, potassium chloride, calcium chloride, or combinations thereof.

The mixture may include an emulsifier such as glyceryl monostearate for maintaining the product softness over time. The emulsifier is present in the mixture in a preferred amount of from 0 to 3%. Other emulsifiers could also be used such as glycerol esters, diacetyl tartaric acids, esters of monoglycerides, mono and di-glycerides, polyglycerol esters, polysorbate, propylene glycol esters, rice extract esters, sodium stearoyl-2-lactylate, sorbitan esters, sugar esters, acetylated monoglycerides, lecithin, or combinations thereof.

A preservative such as potassium sorbate may also be present in the mixture in a preferred amount of from 0 to 1%. Other preservatives such as sodium propionate or potassium benzoate could be used as well.

It should be appreciated that the edible oil, humectant, wheat gluten, food grade acid, buffer, salt, emulsifier, and preservative are optional ingredients.

Process

The multi-piece food product 10 may be formed in the following steps. The ingredients added in these steps are merely exemplary and are not intended to limit the invention. Other combinations of ingredients in accordance with the invention are also possible. For instance, in these steps, the optional ingredients of edible oil, humectant, salt, emulsifier, food grade acid, buffer, corn starch, wheat gluten, and preservative have been added, however, it should be appreciated that the multi-piece food product 10 may be formed without these optional ingredients.

Figure 4:
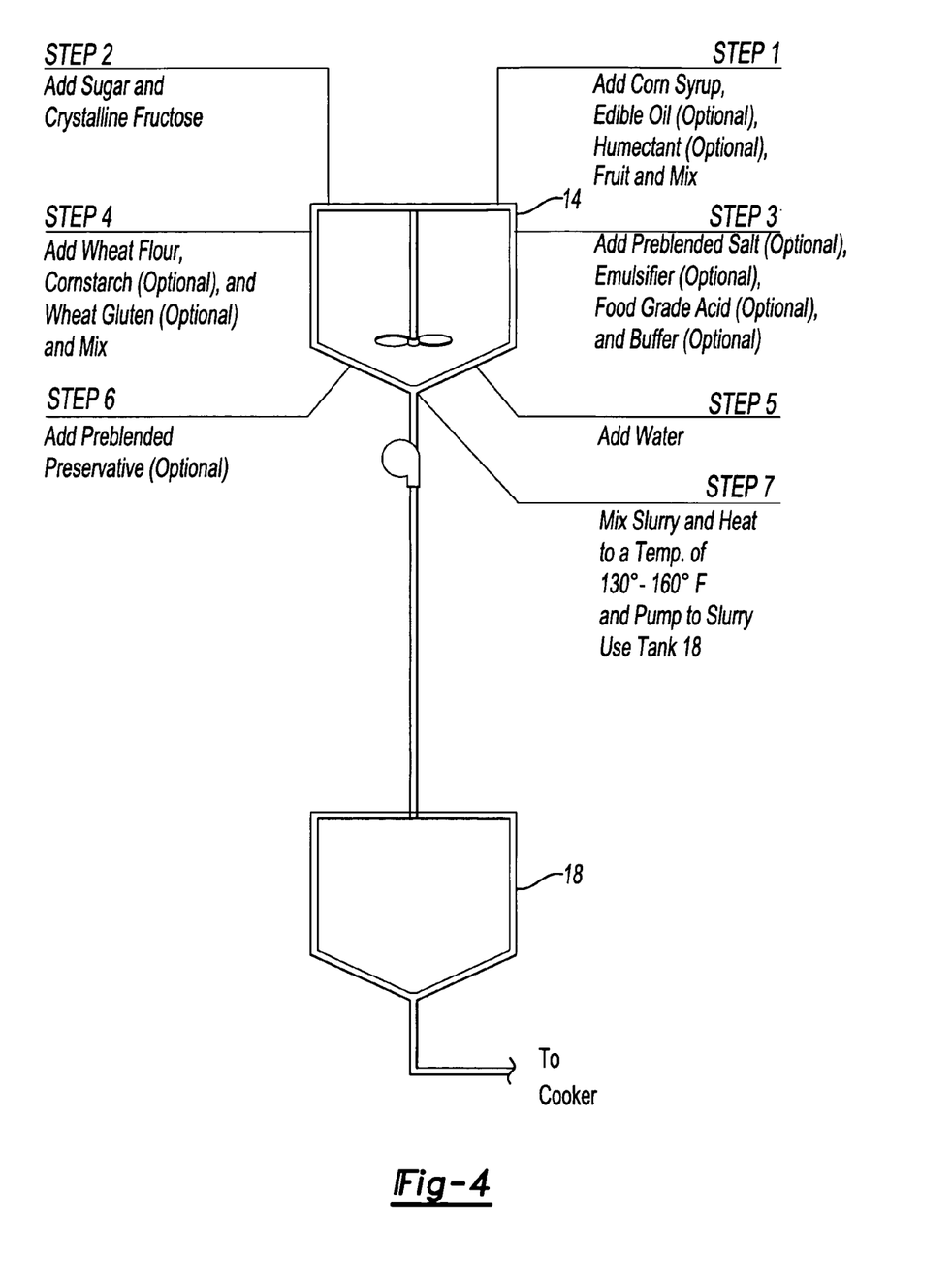
FIG. 4 is a block diagram illustrating the steps carried out by the present invention to prepare a slurry for the multi-piece food product.

Referring to FIG. 4, in a first step, the corn syrup (either 42 DE or 63 DE), edible oil, humectant, and fruit are mixed in a mix tank 14. The mix tank 14 includes a mixer and is thermally controlled. The use of the corn syrup provides sweetness without affecting the texture of the multi-piece food product 10.

In a second step, the sugar and crystalline fructose are added to the mix tank 14.

In a third step, the salt, emulsifier, food grade acid, and buffer are preblended in a separate kettle (not shown) and then added to the mix tank 14.

In a fourth step, the wheat flour, corn starch, and wheat gluten are added to the mix tank 14 and all of the ingredients in the mix tank 14 are mixed.

In a fifth step, the water is added to the mix tank 14 to bring the solids to a range of from 70 to 90% based on a total weight of the slurry.

In a sixth step, the preservative is preblended in a separate kettle (not shown) by dissolving in water. This preblended mixture is then added to the mix tank 14. The preservative is added to prevent molding of the multi-piece food product 10.

In a seventh step, the slurry is heated to a temperature of from 130 to 160 degrees Fahrenheit, preferably 145 degrees Fahrenheit and mixed.

Figure 5:
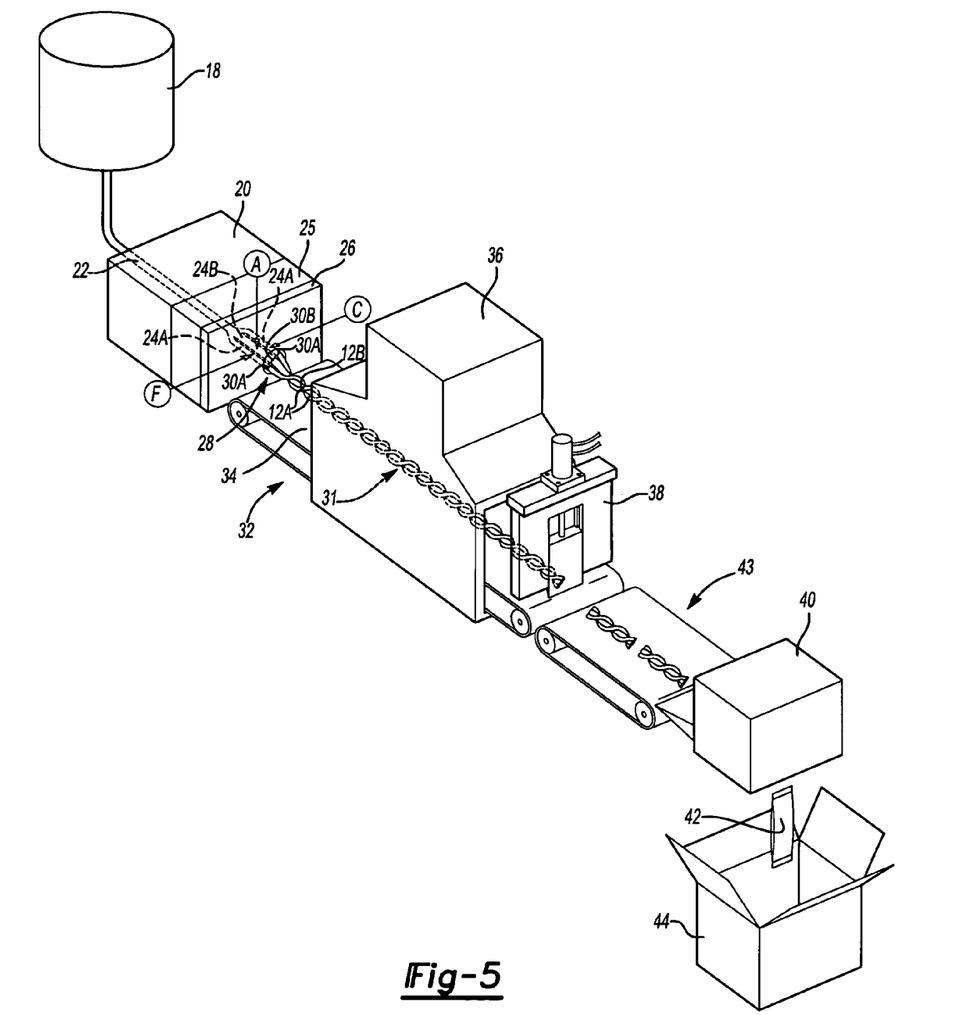
FIG. 5 is a perspective view of processing equipment used to form the multi-piece food product from the slurry prepared in FIG. 2.

From the mix tank 14, the slurry is pumped to a slurry use tank 18, which is thermally controlled. From there, the slurry is fed to a cooker 20, as shown in FIG. 5. At this point, a moisture content of the slurry is preferably from 18 to 35%, and more preferably from 20 to 25%.

The cooker 20 is preferably a cooker extruder such as a Krupp Werner & Pfleiderer™ W-P 120 extruder. The cooker 20 has a barrel 22 within which dual screws (not shown) are rotating to mix and convey the slurry. The barrel 22 has a temperature of from 250 to 350 degrees Fahrenheit to cook the slurry and bring the slurry to a preferred degree of starch and protein gelatinization. At the same time, a vacuum of from 5 to 20 inches of Mercury is drawn in the barrel 22 of the cooker 20 to remove moisture from the slurry. The barrel 22 is cooled using a cooling water circuit (not shown) held at a temperature of from 50 to 70 degrees Fahrenheit to cool the slurry. Optionally, the cooker 20 can be a continuous scraped surface cooker (not shown) such as a BCH Licorice cooker from Coates Engineering™.

A batch process could also be employed to cook the slurry. For instance, the cooker 20 could be a conventional, steam-jacketed kettle cooker with swept-wall agitation (not shown) and the slurry could be pumped from the mix tank 14 to the cooker 20 to batch cook the slurry. Alternatively, the cooker 20 could be an open-air kettle cooker (not shown) to batch cook the slurry. In this instance, the slurry may be additionally pumped through a vacuum pot (not shown) to further remove moisture.

A single food stream exits the cooker 20. In the case of using the cooker extruder, the single food stream is extruded from the cooker 20. When the continuous scraped surface cooker is used, a positive displacement pump at the discharge, like a Waukasha™ model 60, forms the food into the single food stream. When one of the batch cookers is used, the single food stream is pumped from the cooker 20 after each batch is cooked.

The single food stream from the cooker 20 is then fed to a die head 25 such as an ExtruFoods™ DieMix 4 die head and split or divided into at least two food streams, preferably three food streams 24A, 24B including two outer food streams 24A and a center food stream 24B. Of course, the separate food streams 24A, 24B could also be formed by using two or three separate cookers 20, either continuous or batch cookers, as opposed to having only one cooker 20 and splitting the single food stream from the cooker 20 into multiple food streams.

After the slurry is separated into the food streams 24A, 24B, ascorbic acid solution A, colors C, and flavors F are injected into each of the food streams 24A and 24B. This injection is illustrated generally by arrows in FIG. 5 denoted A, C, and F with one arrow directed at each food stream 24A, 24B, even though preferably the ascorbic acid solution A, colors C, and flavors F are injected into each of the food streams 24A, 24B. The ascorbic acid solution A comprises a 25% aqueous ascorbic acid solution based on volume that is prepared and warmed as required to dissolve completely. Injection of the ascorbic acid solution A into the food streams 24A, 24B is optional. The ascorbic acid solution A, colors C, and flavors F could be injected into the slurry before entering the cooker 20 or multiple cookers 20, or the ascorbic acid solution A, colors C, and flavors F could be injected in the cooker 20 or multiple cookers 20.

As previously discussed, different colors C and/or flavors F are preferably injected into the food streams 24A, 24B such that each food stream 24A, 24B has a different color and/or flavor than the other two. A pump (not shown) is used to inject the colors C and/or flavors F into the food streams 24A, 24B. Static and dynamic mixers (not shown) could also be used in each of the food streams 24A, 24B to further mix the ascorbic acid A, colors C, and/or flavors F. The flavors F and colors C are injected at a rate of from 0.2 to 0.8% of total mass flow. At this point in the process, the slurry has a temperature of from 160 to 220 degrees Fahrenheit.

After the ascorbic acid A (optional), colors C, and flavors F are added, the food streams 24A, 24B enter a former 26, e.g., a Bepex-Hutt Formpress System manufactured by Hosokawa BEPEX™, which channels the three food streams 24A, 24B into a header 28. The food streams 24A, 24B are preferably diverted in the header 28 to separate nozzles 30A, 30B. The nozzles 30A, 30B are rotated while the strands 12A, 12B are extruded from the nozzles 30A, 30B and aggregated to form an aggregate food mass 31 having the three intertwined strands 12A, 12B. Those well skilled in the art will appreciate that any number of formers 26 or dies with spinning head arrangements could be used to form the aggregate food mass 31. The former 26 could also be used to co-extrude the strands. Such a former 26 is found in U.S. Pat. No. 6,709,255 to Kappes et al. and U.S. Pat. No. 6,712,595 to Horna et al., herein incorporated by reference. In this instance, co-extrusion is a form of extruding the strands and forming the strands to form the aggregate food mass 31.

In the preferred embodiment of the former 26, the nozzles 30A, 30B can be further defined as two outer nozzles 30A and a center nozzle 30B. Each of the nozzles 30A, 30B rotates about a rotation axis that falls along a centerline (not shown) of the center nozzle 30B. Hence, during operation, the outer strands 12A, which are extruded from the outer nozzles 30A, are spiraled in a helical shape about the center strand 12B, which is extruded from the center nozzle 30B. This nozzle arrangement is illustrated in U.S. patent application Publication No. 2002/0086096 to Fux et al., herein incorporated by reference. Preferably, the outer strands 12A are spiraled once every 2 inches about the center strand 12B to form a convolution every 1 inch. The outer nozzles 30A have a diameter of from 5 to 9 millimeters, while the center nozzle 30B has a diameter of from 6 to 10 millimeters. The result is the outer strands 12A being smaller in diameter than the center strand 12B.

A conveyor system 32 having a conveyor belt 34 transports the food mass 31 from the former 26. The conveyor belt 34 may be coated with a release agent or non-stick coating such as vegetable oil, wax, etc. to facilitate release of the food mass 31 from the conveyor belt 34. As the food mass 31 is transported, immediately after extrusion from the former 26, the food mass 31 has a temperature of from 160 to 220 degrees Fahrenheit. A cooling tunnel 36 cools the food mass 31 for a period of from 5 to 10 minutes as the food mass 31 is transported to yield a final product temperature of from 60 to 80 degrees Fahrenheit. The food mass 31 is shown in hidden lines within the cooling tunnel 36 for illustration. The cooling tunnel 36 is maintained at a temperature of from 50 to 70 degrees Fahrenheit. At this stage in the process, the food mass 31 has a moisture content of from 15 to 20%.

The cooled food mass 31 is conveyed first to a cutter 38 and then to a packager 40. Pieces of the food mass 31 are cut by the cutter 38 in lengths of from 3 to 7 inches and then wrapped in heat-sealed pouches 42 at the packager 40. A separate conveyor system 43 may be used to transport the cut pieces to the packager 40, as shown in FIG. 5. The packager 40 is preferably a horizontal film wrapper 40. The sealed pouches 42 will then be manually cartoned in six count cartons 44 and cased in blank twelve count containers (not shown).

Figure 6:
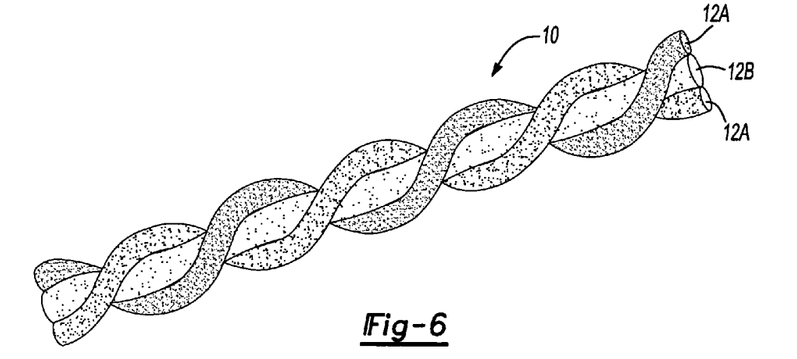
FIG. 6 is a perspective view of an alternative multi-piece food product having three intertwined strands including two outer strands and a center strand with each of the three intertwined strands having a different color or flavor.
Figure 7:
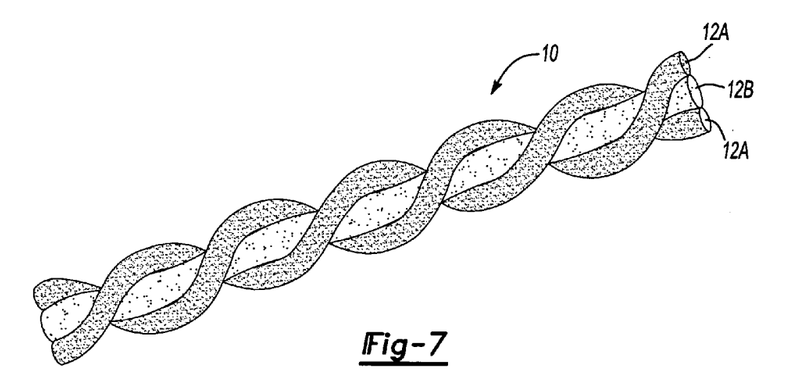
FIG. 7 is a perspective view of an alternative multi-piece food product having three intertwined strands including two outer strands and a center strand with the two outer strands having a different color or flavor than the center strand.
Figure 8:
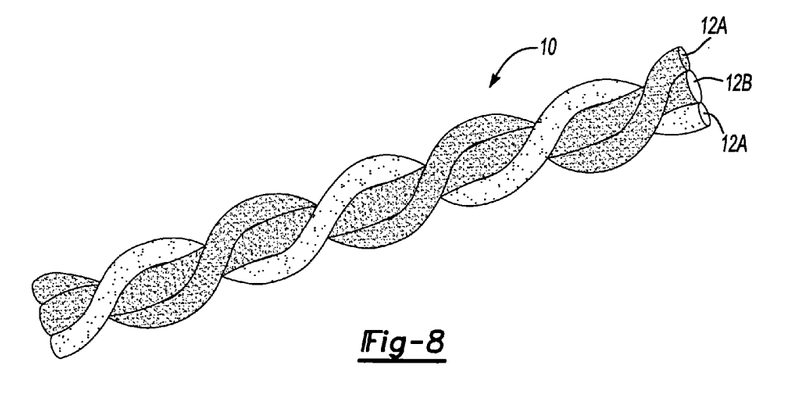
FIG. 8 is a perspective view of an alternative multi-piece food product having three intertwined strands including two outer strands and a center strand with one of the two outer strands and the center strand having a different color or flavor than the other of the two outer strands.

FIGS. 6-8 illustrate sample variations in color and/or flavor of the strands 12A, 12B of the multi-piece food product 10. The different colors and/or flavors are indicated by the different shading used for the elongated strands 12A, 12B. Any combination of colors and/or flavors is possible for the multi-piece food product 10. For instance, FIG. 6 illustrates the multi-piece food product 10 wherein the center strand 12B has a first color, one of the outer strands 12A has a second color, and the other of the outer strands 12A has a third color and each of the first, second, and third colors are different. Likewise, FIG. 6 also illustrates the multi-piece food product 10 wherein the center strand 12B has a first flavor, one of the outer strands 12A has a second flavor, and the other of the outer strands 12A has a third flavor and each of the first, second, and third flavors are different. In FIG. 7, the center strand 12B has a first color or flavor and the outer strands 12A share a second color or flavor different than the first color or flavor. In FIG. 8, the center strand 12B and one of the outer strands 12A share a first color or flavor and the other of the outer strands has a second color or flavor that is different than the first color or flavor.

FIGS. 9-16 illustrate another form of the multi-piece food product 10 produced substantially the same as illustrated above except that the aggregate food mass 31 is formed with three outer strands 12A wrapped about the center strand 12B.

Figure 17:
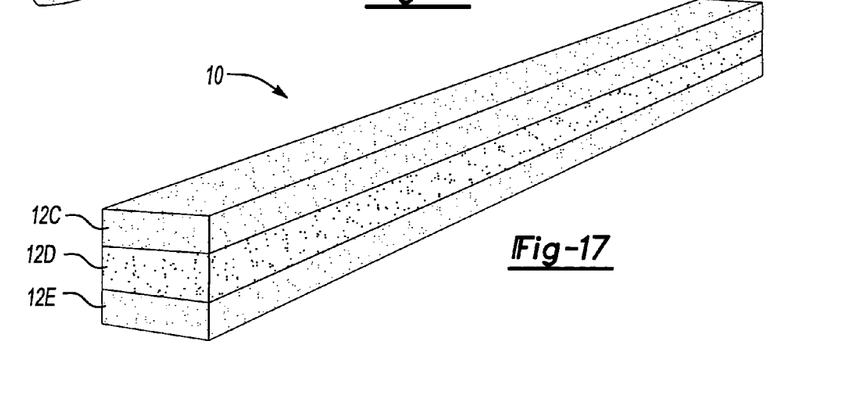
FIG. 17 is a perspective view of an alternative multi-piece food product having three strands that are layered upon one another.
Figure 18:
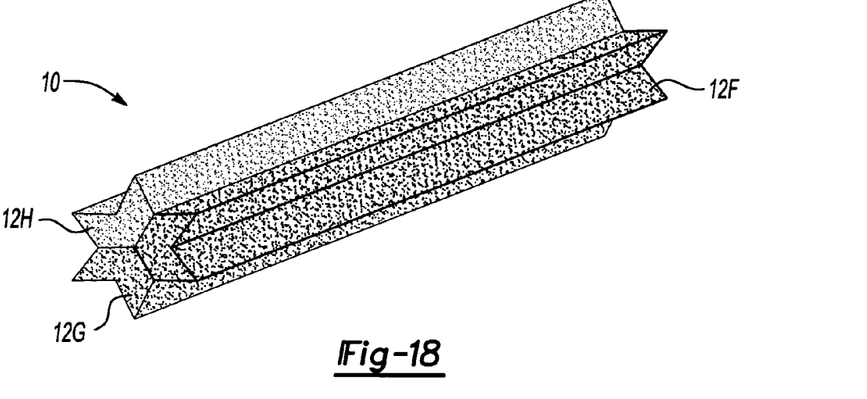
FIG. 18 is an end view of an alternative multi-piece food product having three co-extruded strands forming a star-shaped cross-section.
Figure 19:
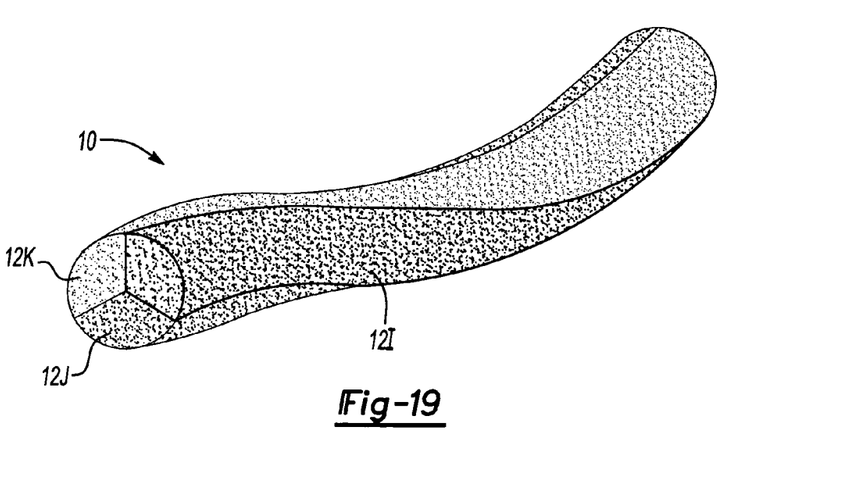
FIG. 19 is an end view of an alternative multi-piece food product having three co-extruded strands forming a round-shaped cross-section.

FIGS. 17-19 illustrate three other forms of the multi-piece food product 10. In FIG. 17, the multi-piece food product 10 includes strands 12C, 12D, and 12E, in the form of thin strips. Here, the thin strips are layered on top of one another to form the aggregate food mass 31, either by co-extruding the strips, as discussed above, or by layering the strips together after extrusion. In FIG. 18, the multi-piece food product 10 includes strands 12F, 12G, and 12H. Here, the strands 12F, 12G, and 12H are shown as forming the aggregate food mass 31 with a star-shaped cross-section. In FIG. 19, the multi-piece food product 10 includes strands 12I, 12J, and 12K. Here, the strands 12I, 12J, and 12K are shown as forming the aggregate food mass 31 with a round-shaped cross-section. The multi-piece food products 10 of FIGS. 17-19 illustrate two examples in which the strands are extruded and formed or aggregated by co-extrusion. As before, each of the strands of these additional embodiments may include any combination of colors and/or flavors.

Figure 9:
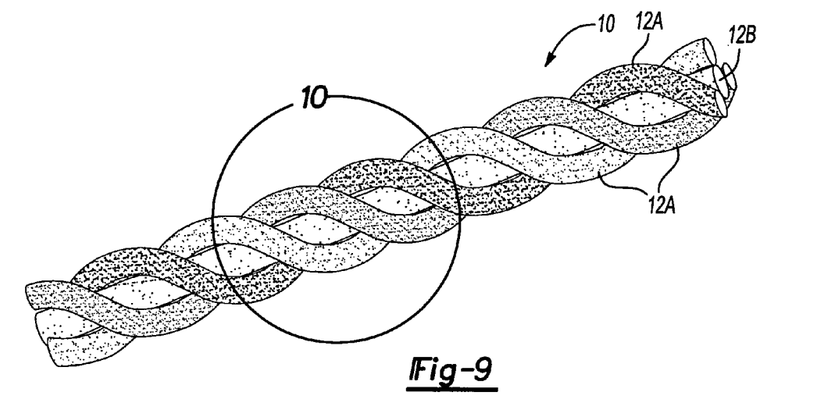
FIG. 9 is a perspective view of an alternative multi-piece food product having four intertwined strands including three outer strands and a center strand with each of the strands having a different color or flavor.
Figure 10:
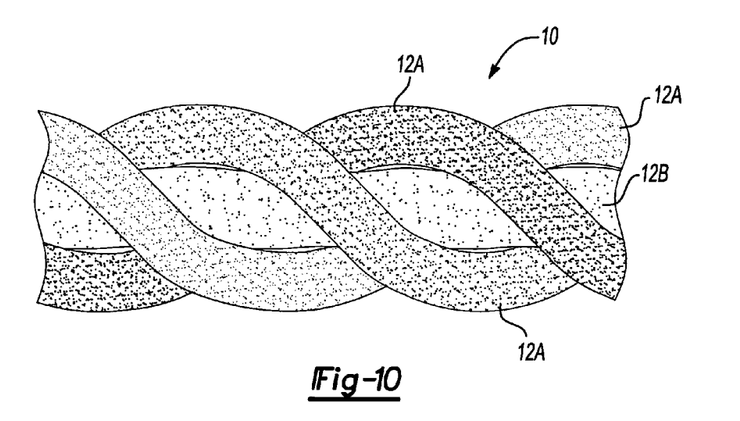
FIG. 10 is a fragmented elevational view of the multi-piece food product of FIG. 9.
Figure 11:
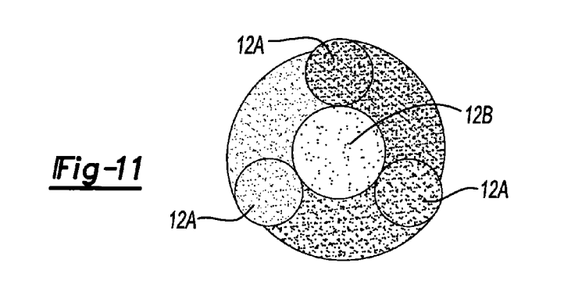
FIG. 11 is an end view of the multi-piece food product of FIG. 9.
Figure 12:
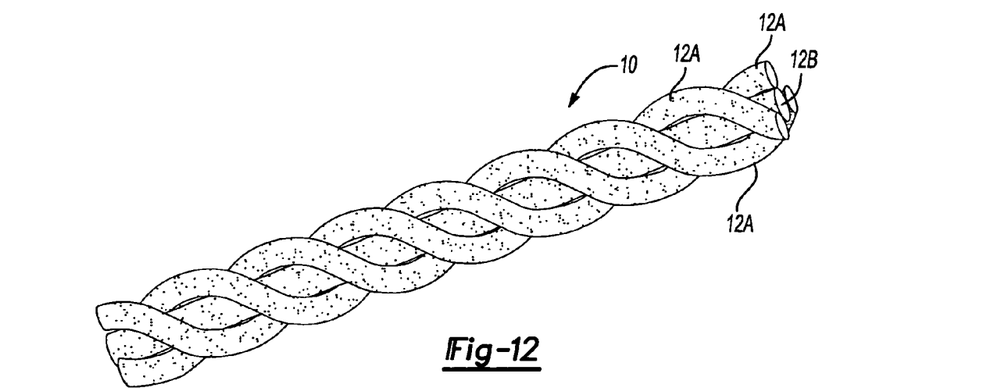
FIG. 12 is a perspective view of an alternative multi-piece food product having four intertwined strands including three outer strands and a center strand with each of the strands having the same color or flavor.
Figure 13:
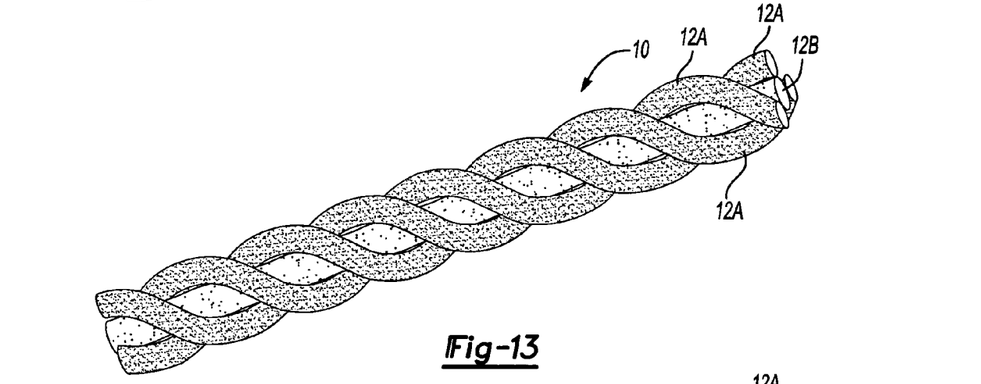
FIG. 13 is a perspective view of an alternative multi-piece food product having four intertwined strands including three outer strands and a center strand with each of the three outer strands having a different color or flavor than the center strand.
Figure 14:
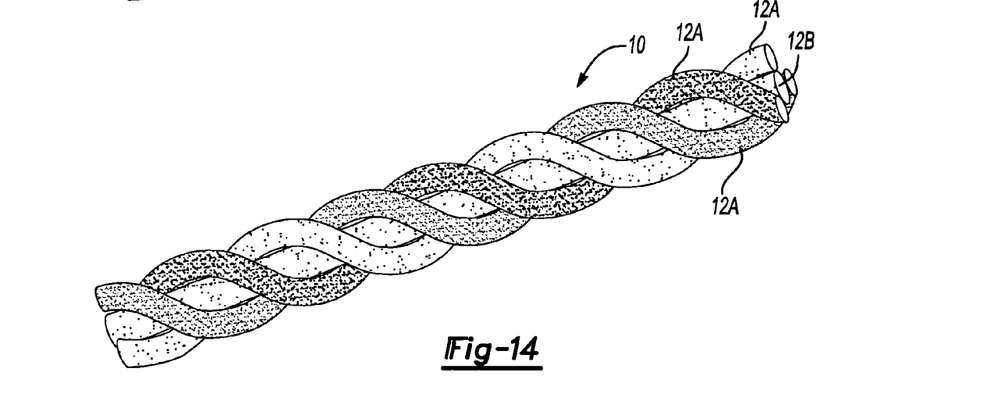
FIG. 14 is a perspective view of an alternative multi-piece food product having four intertwined strands including three outer strands and a center strand with one of the three outer strands and the center strand having a different color or flavor than each of the other two outer strands.
Figure 15:
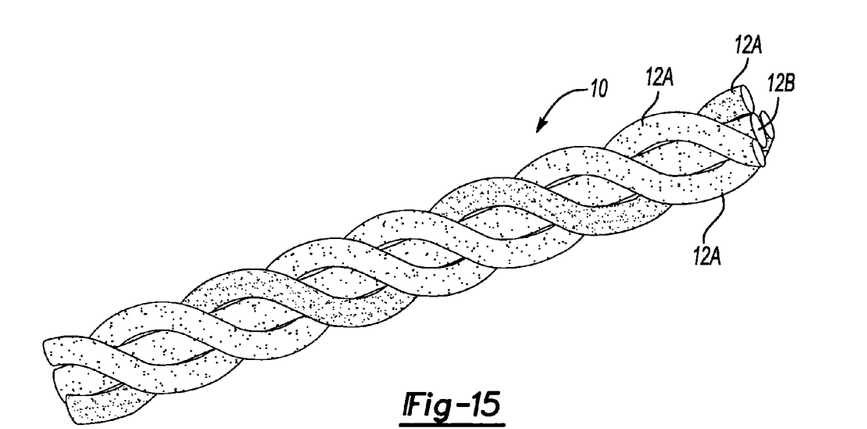
FIG. 15 is a perspective view of an alternative multi-piece food product having four intertwined strands including three outer strands and a center strand with two of the three outer strands and the center strand having a different color or flavor than the other outer strand.
Figure 16:
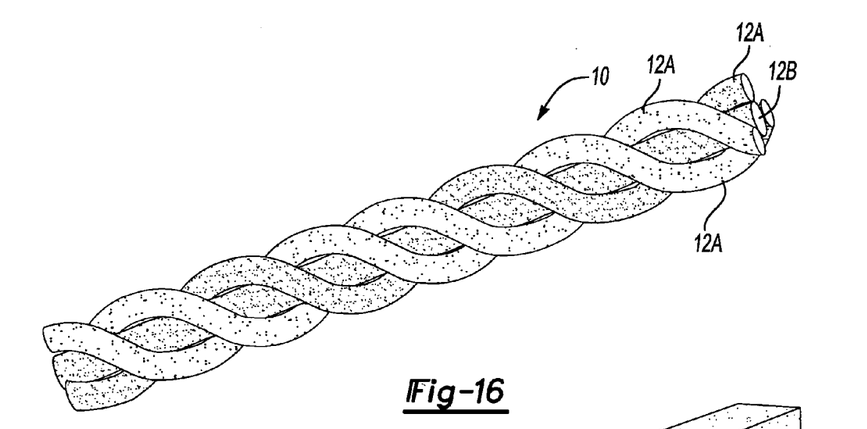
FIG. 16 is a perspective view of an alternative multi-piece food product having four intertwined strands including three outer strands and a center strand with one of the three outer strands and the center strand having a different color or flavor than the other two outer strands.

Further embodiments of the form of the multi-piece food product 10 (not shown), such as one with two or three outer strands 12A that are intertwined together, such as shown in FIGS. 1 and 9, without the center strand 12B are also possible. The strands 12A, 12B could also be braided together (three or more strands) to form the multi-piece food products 10. Thus, the strands 12A, 12B formed by the process illustrated above can be aggregated in a variety of manners to form the aggregate food mass 31.

Obviously, many other modifications and variations of the present invention are possible in light of the above teachings. For instance, multiple headers 28 could be used to simultaneously extrude multiple aggregate food masses 31 onto multiple lanes on the conveyor belt 34. Likewise, the cooling tunnel 36, cutter 38, and packager 40 could be configured to accommodate multiple lanes.

What is claimed is:

1. A multi-piece confectionary food product, comprising:
   a center confectionary strand of edible material having a length lying along a first axis;
   a first outer confectionary strand of edible material wrapped about said center strand along said length thereof to define a first plurality of convolutions wrapped about said center strand;
   a second outer confectionary strand of edible material wrapped about said center strand along said length thereof to define a second plurality of convolutions wrapped about said center strand wherein said second plurality of convolutions are interpositioned about said center strand relative to said first plurality of convolutions; and
   said edible material of each of said strands being formed from a cooked mixture of 20 to 70% sweetener, 15 to 40% starchy material, and 1 to 25% fruit by weight based on the total dry weight of said mixture and wherein said fruit includes at least 40% solids content.

2. A multi-piece food product as set forth in claim 1 wherein said starchy material includes wheat flour.

3. A multi-piece food product as set forth in claim 2 wherein said wheat flour is present in said mixture in an amount of from 20 to 35% by weight based on the total dry weight of said mixture.

4. A multi-piece food product as set forth in claim 2 wherein said wheat flour is present in said mixture in an amount of from 25 to 30% by weight based on the total dry weight of said mixture.

5. A multi-piece food product as set forth in claim 1 wherein said fruit includes at least one of fruit powder, fruit solids, fruit concentrate or fruit puree.

6. A multi-piece food product as set forth in claim 5 wherein said fruit is present in said mixture in an amount of from 1 to 10% by weight based on the total dry weight of said mixture.

7. A multi-piece food product as set forth in claim 5 wherein said fruit is present in said mixture in an amount of from 1 to 8% by weight based on the total dry weight of said mixture.

8. A multi-piece food product as set forth in claim 1 wherein said sweetener includes at least one of sucrose, dextrose, fructose, crystalline fructose, lactose, malt syrup, malt syrup solids, rice syrup solids, rice syrup, sorghum syrup, invert sugar, refiners syrup, corn syrup, corn syrup solids, maltose, high fructose corn syrup, honey, molasses, sugar alcohols, maltodextrin, or combinations thereof.

9. A multi-piece food product as set forth in claim 1 wherein said sweetener is present in said mixture in an amount of from 50 to 70% by weight based on the total dry weight of said mixture and said sweetener includes at least one of sucrose, dextrose, fructose, crystalline fructose, lactose, malt syrup, malt syrup solids, rice syrup solids, rice syrup, sorghum syrup, invert sugar, refiners syrup, corn syrup, corn syrup solids, maltose, high fructose corn syrup, honey, molasses, sugar alcohols, maltodextrin, or combinations thereof.

10. A multi-piece food product as set forth in claim 1 wherein said sweetener is present in said mixture in an amount of from 60 to 65% by weight based on the total dry weight of said mixture and said sweetener includes at least one of sucrose, dextrose, fructose, crystalline fructose, lactose, malt syrup, malt syrup solids, rice syrup solids, rice syrup, sorghum syrup, invert sugar, refiners syrup, corn syrup, corn syrup solids, maltose, high fructose corn syrup, honey, molasses, sugar alcohols, maltodextrin, or combinations thereof.

11. A multi-piece food product as set forth in claim 1 wherein said mixture includes 1 to 5% of edible oil by weight based on the total dry weight of said mixture.

12. A multi-piece food product as set forth in claim 1 wherein said center strand and each of said outer strands share a first color.

13. A multi-piece food product as set forth in claim 1 wherein said center strand has a first color and said outer strands share a second color different than said first color.

14. A multi-piece food product as set forth in claim 1 wherein said center strand and one of said outer strands share a first color and the other of said outer strands has a second color that is different than said first color.

15. A multi-piece food product as set forth in claim 1 wherein said center strand has a first color, one of said outer strands has a second color, and the other of said outer strands has a third color and each of said first, second, and third colors are different from each other.

16. A multi-piece food product as set forth in claim 1 wherein said center strand and each of said outer strands share a first flavor.

17. A multi-piece food product as set forth in claim 1 wherein said center strand has a first flavor and said outer strands share a second flavor different than said first flavor.

18. A multi-piece food product as set forth in claim 1 wherein said center strand and one of said outer strands share a first flavor and the other of said outer strands has a second flavor that is different than said first flavor.

19. A multi-piece food product as set forth in claim 1 wherein said center strand has a first flavor, one of said outer strands has a second flavor, and the other of said outer strands has a third flavor and each of said first, second, and third flavors are different from each other.

20. A multi-piece food product as set forth in claim 1 wherein said center strand has a diameter of from 6 to 10 millimeters and each of said outer strands have a diameter of from 5 to 9 millimeters.

21. A multi-piece food product as set forth in claim 1 wherein said length of said center strand is from 3 to 7 inches.

22. A multi-piece confectionary food product, comprising:
a center strand of edible material having a length lying along a first axis;
a first outer strand of edible material wrapped about said center strand along said length thereof to define a first plurality of convolutions wrapped about said center strand;
a second outer strand of edible material wrapped about said center strand along said length thereof to define a second plurality of convolutions wrapped about said center strand wherein said second plurality of convolutions are interpositioned about said center strand relative to said first plurality of convolutions and wherein each of said strands is capable of being separated from the other strands; and
said edible material of each of said strands being formed from a cooked mixture of 20 to 70% sweetener, 15 to 40% starchy material, and 1 to 25% fruit by weight based on the total dry weight of said mixture.

* * * * *

UNITED STATES PATENT AND TRADEMARK OFFICE
CERTIFICATE OF CORRECTION

| | | |
|---|---|---|
| PATENT NO. | : 8,029,849 B2 | Page 1 of 1 |
| APPLICATION NO. | : 10/944209 | |
| DATED | : October 4, 2011 | |
| INVENTOR(S) | : Stephen B. Richey et al. | |

It is certified that error appears in the above-identified patent and that said Letters Patent is hereby corrected as shown below:

Column 9, Line 60: "121" should read -- 12I --.

Column 9, Line 61: "121" should read -- 12I --.

Signed and Sealed this

Thirteenth Day of March, 2012

David J. Kappos
*Director of the United States Patent and Trademark Office*